(12) United States Patent
Newell

(10) Patent No.: US 11,397,330 B2
(45) Date of Patent: Jul. 26, 2022

(54) LIGHT TUNNEL AND METHOD OF MANUFACTURING THE SAME

(71) Applicant: MATERION CORPORATION, Mayfield Heights, OH (US)

(72) Inventor: Michael P. Newell, Mayfield Heights, OH (US)

(73) Assignee: MATERION CORPORATION, Mayfield Heights, OH (US)

(*) Notice: Subject to any disclaimer, the term of this patent is extended or adjusted under 35 U.S.C. 154(b) by 0 days.

(21) Appl. No.: 17/052,368

(22) PCT Filed: May 1, 2019

(86) PCT No.: PCT/US2019/030104
§ 371 (c)(1),
(2) Date: Nov. 2, 2020

(87) PCT Pub. No.: WO2019/213191
PCT Pub. Date: Nov. 7, 2019

(65) Prior Publication Data
US 2021/0173220 A1 Jun. 10, 2021

Related U.S. Application Data

(60) Provisional application No. 62/665,152, filed on May 1, 2018.

(51) Int. Cl.
*G02B 27/09* (2006.01)
*F21V 8/00* (2006.01)

(52) U.S. Cl.
CPC ....... *G02B 27/0994* (2013.01); *G02B 6/0065* (2013.01); *G02B 27/0977* (2013.01)

(58) Field of Classification Search
CPC ............ G02B 27/0977; G02B 27/0994; G02B 6/0065
See application file for complete search history.

(56) References Cited

U.S. PATENT DOCUMENTS 5,828,505 A * 10/1998 Farmiga ............. G02B 27/0977
359/857
2005/0180715 A1 8/2005 Chin et al.
(Continued)

FOREIGN PATENT DOCUMENTS

JP S60140202 7/1985

OTHER PUBLICATIONS

International Search Report, PCT/US2019/030104; dated Jul. 8, 2019; 3 pgs.
(Continued)

*Primary Examiner* — Peter Radkowski
(74) *Attorney, Agent, or Firm* — Tucker Ellis LLP

(57) ABSTRACT

An optical device comprises two flat plates each having a reflective flat surface, and two flat spacer plates of thickness H each having a reflective sidewall. The flat plates and flat spacer plates are arranged as a stack with the reflective flat surfaces facing each other and the flat spacer plates arranged in a single plane and disposed between the two flat plates with the reflective sidewalls facing each other and with a gap between the two reflective sidewalls. The facing reflective flat surfaces and facing reflective sidewalls define a light tunnel passage with dimension H in the direction transverse to the single plane. The facing reflective sidewalls may be mutually parallel and spaced by a constant gap W to provide a light tunnel passage with constant cross-section H×W, or may be oriented at an angle to provide a tapered light tunnel passage.

20 Claims, 4 Drawing Sheets

(56) References Cited

U.S. PATENT DOCUMENTS

| | | | |
|---|---|---|---|
| 2005/0270793 A1* | 12/2005 | Chang | G02B 27/0994 |
| | | | 362/551 |
| 2006/0176452 A1 | 8/2006 | Kim et al. | |
| 2008/0158520 A1* | 7/2008 | Hsu | G03B 21/28 |
| | | | 353/84 |
| 2009/0052042 A1 | 2/2009 | Liao | |

OTHER PUBLICATIONS

Chinese Search Report dated Feb. 18, 2022 for Application Serial No. CN201980034607 (3 pages).
Chinese Office Action dated Feb. 25, 2022 for Application Serial No. CN201980034607 (7 pages).

* cited by examiner

Section S-S

LIGHT TUNNEL AND METHOD OF MANUFACTURING THE SAME

CROSS-REFERENCE TO RELATED APPLICATIONS

This application claims priority to U.S. Provisional patent Application Ser. No. 62/665,152, filed on May 1, 2018, the entirety of which is incorporated by reference herein.

BACKGROUND

The following relates to the optical device arts, photonics arts, light tunnel device arts, and applications of same such as light mixing, light projector systems, projection television, and the like.

A light tunnel comprises a tube with reflective inner surface. In an optical design in which a light tunnel connects a light source with downstream optical components, the light tunnel serves as an optical integrator rod to homogenize the light. For example, in a projection display device, a projector lamp may be focused onto the input aperture of a light tunnel, and the light exiting the output aperture of the light tunnel is thereby made more uniform over the area of the output aperture. A light tunnel is largely etendue-preserving—accordingly, the divergence characteristics of the light output at the exit aperture can be designed by way of a suitable taper in the light tunnel. A light tunnel can provide additional or other benefits, such as providing an enclosed optical pathway for connecting a hot incandescent lamp with heat-sensitive downstream optics. A light tunnel can also be used to shape the light—for example, in a projector system for a pixelated display device a light tunnel with rectangular cross-section provides a rectangular light source at the output aperture that can be designed to match a rectangular Digital Micromirror Device (DMD), pixelated LCD display device, or the like.

Light tunnels rely upon strong interaction between the light and the reflective inside surfaces of the light tunnel to provide an optical integrator (light mixing) effect. In geometric light ray modeling this amounts to multiple reflections (on average) of light rays passing through the light tunnel. Consequently, for high optical efficiency the inside surfaces of the light tunnel should have very high reflectivity. If there are (on average) N reflections and the surfaces have reflectivity r then the output is $r^N$ and losses are $(1-r^N)$. For example, if r=95% and there are on average N=4 reflections, the optical loss is $(1-0.95^4)$=18% loss. If reflectivity is increased to r=97% this decreases to 11% loss, and at r=98% the loss is down to 7.8%. In one approach for manufacturing a light tunnel with rectangular cross-section having high optical efficiency, four glass plates with high reflectivity coatings are arranged end-to-end with each plate at 90° orientation to the adjacent plate, and with the high-reflectivity coatings forming the inside surfaces of the light tunnel. A mandrill may be used to temporarily hold the four glass plates while their adjacent ends are glued or otherwise secured.

Some improvements are disclosed herein.

BRIEF DESCRIPTION

In some illustrative aspects disclosed herein, an optical device is disclosed, which comprises a first element having a first reflective flat surface, a second element having a second reflective flat surface, and two flat spacer plates each having a reflective sidewall. The two flat spacer plates are arranged in a single plane with the reflective sidewalls of the two flat spacer plates facing each other with a gap between the two facing reflective sidewalls. The first reflective flat surface is arranged parallel with the single plane containing the two flat spacer plates and in contact with two flat spacer plates. The second reflective flat surface is arranged parallel with the single plane containing the two flat spacer plates and in contact with two flat spacer plates. The first reflective flat surface and the second reflective flat surface are arranged on opposite sides of the single plane.

In some illustrative aspects disclosed herein, an optical device comprises a first element having a first reflective flat surface, a second element having a second reflective flat surface facing the first reflective flat surface, and two flat spacer plates of thickness H arranged in a single plane with facing reflective spacer plate sidewalls. The two flat spacer plates are disposed between the facing first and second reflective flat surfaces and space apart the facing first and second reflective flat surfaces apart by the thickness H.

In some illustrative aspects disclosed herein, an optical device comprises two flat plates each having a reflective flat surface, and two flat spacer plates of thickness H each having a reflective sidewall. The two flat plates and the two flat spacer plates are arranged as a stack of plates with the reflective flat surfaces of the two flat plates facing each other and the two flat spacer plates arranged in a single plane and disposed between the two flat plates with the reflective sidewalls facing each other and with a gap between the two reflective sidewalls of the two flat spacer plates. The facing reflective flat surfaces of the two flat plates and the facing reflective sidewalls of the two flat spacer plates define a light tunnel passage with dimension H in the direction transverse to the single plane.

In some illustrative aspects disclosed herein, a method is disclosed of fabricating a light tunnel. Two flat surfaces are coated with a reflective coating to define two reflective flat surfaces. At least one sidewall of each of two flat spacer plates is coated with a reflective coating to define spacer plates each having a reflective sidewall. The two flat surfaces and the two spacer plates are secured together with the two flat surfaces facing each other and the two flat spacer plates disposed in a single plane between the two facing flat surfaces, and with the reflective sidewalls facing each other. In this way, a light tunnel passage is defined by the two facing flat surfaces and the two facing reflective sidewalls.

DETAILED DESCRIPTION

The rectangular light tunnel manufacturing approach of arranging four glass plates to form a rectangle with high-reflectivity surfaces of the glass plates arranged facing inward to form the inside surfaces of the light tunnel is effective for typical light tunnel sizes, e.g. with aperture area of approximately one square centimeter to a few square centimeters or larger. However, it has been found that manufacturing smaller light tunnels with cross-sectional areas on the order of sub-millimeter squared to a few square millimeters by this method is difficult, due to tediousness in handling, positioning, and assembling the constituent glass plates. Embodiments disclosed herein provide improved manufacturability with improved handling, easier component positioning and assembly. Embodiments disclosed herein are also scalable for high throughput manufacturing. Still further, embodiments disclosed herein are readily employed for tapered light tunnels.

Figure 1:
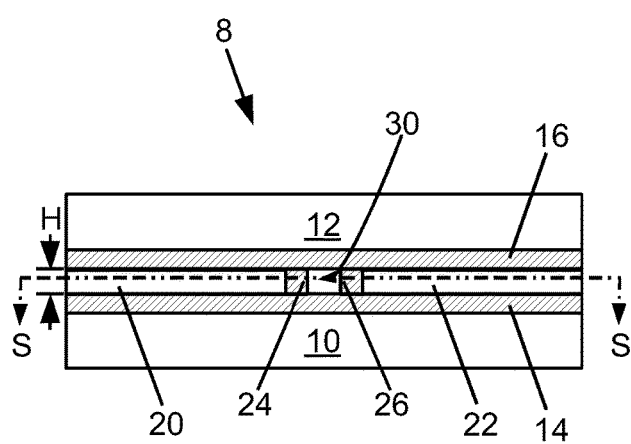
FIG. 1 diagrammatically illustrates an end view of a light tunnel.
Figure 2:
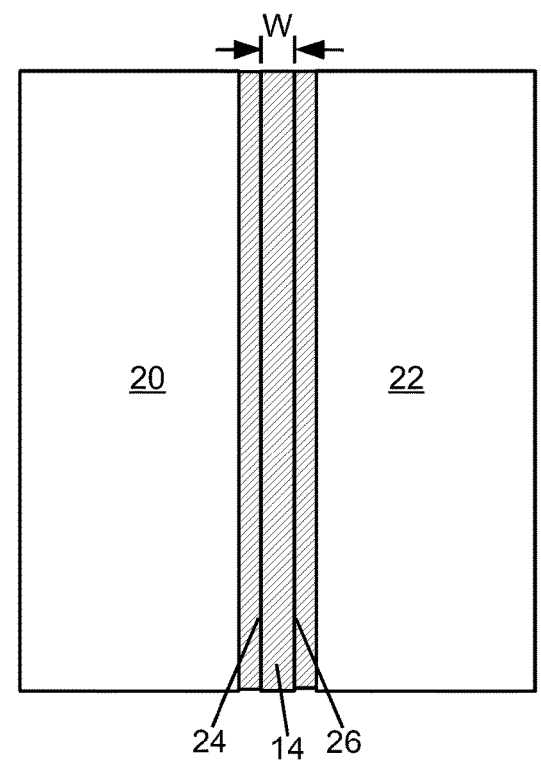
FIG. 2 diagrammatically illustrates Section S-S indicated in FIG. 1.

With reference to FIG. 1, an end view of a light tunnel 8 is shown. FIG. 2 illustrates Section S-S indicated in FIG. 1. The light tunnel 8 includes a first element 10 and a second element 12. The first element 10 has a first reflective flat surface 14, and the second element 12 has a second reflective flat surface 16. In a suitable embodiment, the two elements 10, 12 are flat plates, e.g. flat glass plates. The light tunnel 8 further includes two flat spacer plates 20, 22. The flat spacer plate 20 has a reflective sidewall 24, and the flat spacer plate 22 has a reflective sidewall 26. In a suitable embodiment, the two flat spacer plates 20, 22 are flat glass plates.

The reflective surfaces 14, 16 and the reflective sidewalls 24, 26 preferably have high reflectivity, e.g. reflectivity $r>90\%$, and more preferably $r>95\%$, and still more preferably $r>98\%$. For example, each of the reflective surfaces 14, 16 and reflective sidewalls 24, 26 may comprise a reflective multi-layer optical interference filter coating designed using conventional interference filter design methods to provide the desired high reflectivity for a design-basis spectral wavelength or wavelength band. By way of non-limiting illustration, the reflective surfaces 14, 16 and sidewalls 24, 26 may have interference filter coatings made up of alternating layers of silicon (a-Si:H) and a lower refractive index dielectric such as $SiO_2$, silicon oxynitride ($SiO_xN_y$), tantalum pentoxide ($Ta_2O_5$), niobium pentoxide ($Nb_2O_5$), or titanium dioxide ($TiO_2$). Instead of an interference filter, the reflective surfaces 14, 16 and reflective sidewalls 24, 26 may comprise a reflective metal such as silver (Ag, up to $r=98\%$ depending on wavelength), aluminum (Al, up to $r=95\%$ depending on wavelength), or so forth, optionally with still higher reflectivity provided by surface passivation or other surface treatment/overlayer(s). In some embodiments, the reflective coatings of the reflective surfaces 14, 16 and reflective sidewalls 24, 26 have reflectivity of at least 0.95 over the wavelength range 400-700 nanometers inclusive. More generally, the reflective surfaces 14, 16 and reflective sidewalls 24, 26 preferably have reflectivity of 0.9 or higher (i.e. 90% or higher) for a design wavelength or wavelength band, and more preferably have reflectivity of 0.95 or higher (i.e. 95% or higher) for the design wavelength or wavelength band.

As best seen in FIG. 1, in the light tunnel 8 the two flat spacer plates 20, 22 are arranged in a single plane (e.g., the plane of indicated Section S-S) with the reflective sidewalls 24, 26 of the two flat spacer plates 20, 22 facing each other with a gap W (indicated in Section S-S shown in FIG. 2) between the two facing reflective sidewalls 24, 26. This gap W defines the width W of the light tunnel 8. It should be noted that the drawings are diagrammatic—typically, the reflective coatings applied to form the reflective surfaces 14, 16 and the reflective sidewalls 24, 26 are assumed to have negligible thickness, e.g. on the order of a micron or so. If the coating thicknesses are not negligible, then the position of each of reflective surface 14, 16 and of each reflective sidewall 24, 26 is defined as top exposed reflective surface of reflective coating.

Furthermore, in the light tunnel 8 the first reflective flat surface 14 is arranged parallel with the single plane containing the two flat spacer plates 20, 22 (i.e., parallel with the section plane of section S-S shown in FIG. 1). Furthermore, the two reflective flat surfaces 14, 16 are arranged facing each other on opposite sides of the single plane (i.e. illustrative section plane S-S) and in contact with two flat spacer plates 20, 22. With this arrangement, the light tunnel 8 has a rectangular cross-section with the already-mentioned width W and with a height H equal to the thickness of the two flat spacer plates 20, 22 (which are assumed to have the same thickness within design tolerances). In general, there is no requirement for height H and width W to be equal, although these dimensions could be equal if appropriate for the specific light tunnel design. The light tunnel 8 has a rectangular passage 30 of dimensions H×W defined by (1) the two facing reflective surfaces 14, 16 of the respective first and second elements 10, 12 having thickness H and (2) the two facing reflective sidewalls 24, 26 of the two flat spacer plates 20, 22 spaced apart by the gap W. It should be noted that while the illustrative sidewalls 24, 26 are straight and orthogonal to the reflective surfaces 14, 16, this is not strictly necessary although any deviation from a straight orthogonal sidewall profile and orientation should be analyzed as to its impact on light losses; on the other hand, having the reflective sidewalls 24, 26 with some convex or concave curvature may beneficially aid in light mixing.

It is noted that in the Section S-S view of FIG. 2, the two flat spacer plates 20, 22 are drawn as being opaque, so that the underlying reflective surface 14 of the first element 10 is not visible except in the gap W between the reflective sidewalls 24, 26 of the two flat spacer plates 20, 22. It will be appreciated that if the two flat spacer plates 20, 22 are made of a transparent material such as glass, then the sectional view of Section S-S would actually have the reflective surface 14 visible through the transparent flat spacer plates 20, 22. However, since the two facing reflective surfaces 14, 16 and the two facing reflective sidewalls 24, 26 together form a continuous perimeter of the rectangular passage 30 of dimensions H×W, the transparency or opacity of the flat spacer plates 20, 22, or for that matter the transparency or opacity of the elements 10, 12, does not impact the optical properties of the rectangular passage 30 which is the optical light tunnel.

Figure 3:
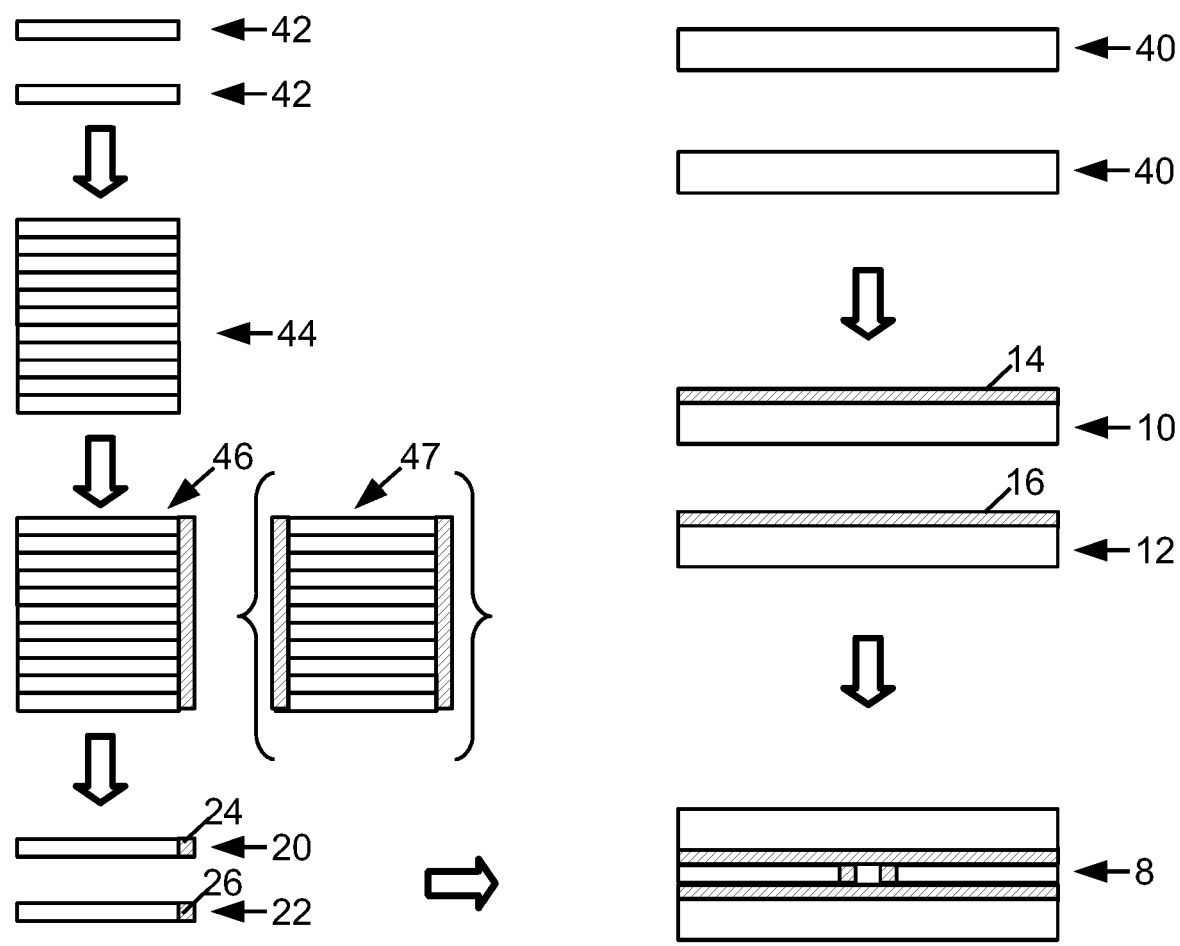
FIG. 3 diagrammatically illustrates a manufacturing process for manufacturing the light tunnel depicted in FIGS. 1 and 2.

With reference now to FIG. 3, a manufacturing process for manufacturing the light tunnel 8 of FIGS. 1 and 2 is described. The first and second elements 10, 12 are manufactured in this illustrative example from glass plates 40 (e.g., glass microscope slides, by way of non-limiting illustrative example) by coating two flat surfaces of the glass plates 40 with a reflective coating to define two reflective flat surfaces 14, 16. In some embodiments, this may be done by coating a single surface of a larger glass plate that is then cut (i.e. diced) to form the individual glass plates 10, 12 with reflective coatings 14, 16. It will be appreciated that scalability is readily achieved as a large industrial-scale coating machine can coat many such elements in a single batch process.

In parallel, the two flat spacer plates 20, 22 are formed, optionally as individual parts of a large batch process. As diagrammatically shown in FIG. 3, two constituent glass plates 42 each of thickness H are assembled, with other fungible glass plates 42, to form a plates stack 44. In this stack, all sidewalls on one side of the stack 44 are parallel and facing the same direction—thus, all these sidewalls can be coated in a single batch coating process to produce a coated stack 46 with coated sidewalls. Moreover, smaller thickness H for the glass plates 42 enables more such plates to be assembled in the stack 44, so that scalability actually increases with decreasing thickness H (and hence with decreasing dimension H of the resulting light tunnel passage 30). The individual plates of the coated stack 46 are then disassembled and any two constituent coated plates of the stack 46 of fungible plates are chosen as the two flat spacer plates 20, 22 with respective coated sidewalls 24, 26.

Finally, as indicated in FIG. 3, the four constituent pieces 10, 12, 20, 22 are secured together with the two flat surfaces 14, 16 facing each other and the two flat spacer plates 20, 22 disposed in a single plane between the two facing flat surfaces 14, 16 and with the reflective sidewalls 24, 26 facing each other whereby the light tunnel passage 30 is defined by the two facing flat surfaces 14, 16 and the two facing reflective sidewalls 24, 26.

With continuing reference to FIG. 3, in a modified embodiment shown as a parenthetical, the stack 44 is coated on two opposite sides to produce the coated stack 47. The advantage of this approach is that handling is improved, and the possibility of assembly error is reduced.

The light tunnel passage 30 has a rectangular cross section of dimensions H×W with constant dimension H in the direction transverse to the single plane (i.e., the section plane of Section S-S in illustrative FIGS. 1 and 2) and constant dimension W in the direction parallel with the single plane. With the two facing sidewalls 24, 26 mutually parallel, the dimensions H and W are constant along the entire length of the light tunnel. The dimension H is determined by the thickness of the two spacer plates 20, 22 (neglecting any thickness of glue or other adhesive that may optionally be applied to bond the surfaces 14, 16 to the spacer plates 20, 22; in some embodiments, no adhesive is used and instead the assembly is clamped together). This dimension H can be made as small as the practical thickness of the stock glass plate or plates from which the plates 42 are cut or obtained. For example, in some contemplated embodiments H is four millimeters or smaller, although larger values for H are also contemplated. Similarly, the gap W between the facing reflective sidewalls 24, 26 can be made almost arbitrarily small. For example, a mandrill (or spacer) can be inserted during the assembly to provide a defined gap W, which is then removed after the assembly. The gap W may, therefore, in some embodiments be four millimeters or smaller as well, although again larger values for the gap W are contemplated. In some embodiments, the dimensions of the aperture H×W are contemplated to define a submillimeter aperture, i.e. H and/or W may be less than one millimeter.

Figure 4:
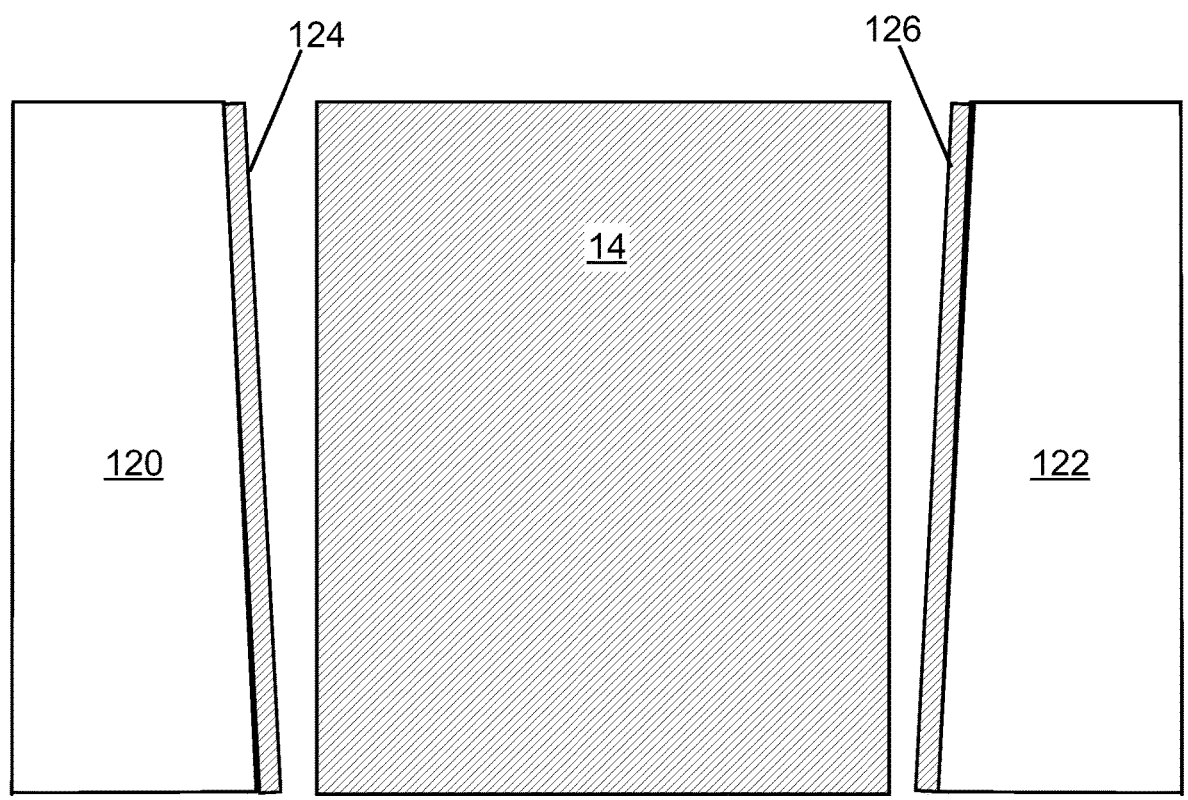
FIGS. 4 and 5 illustrate an alternative tapered light tunnel embodiment by way of an exploded Section S-S view and a Section S-S view, respectively.
Figure 5:
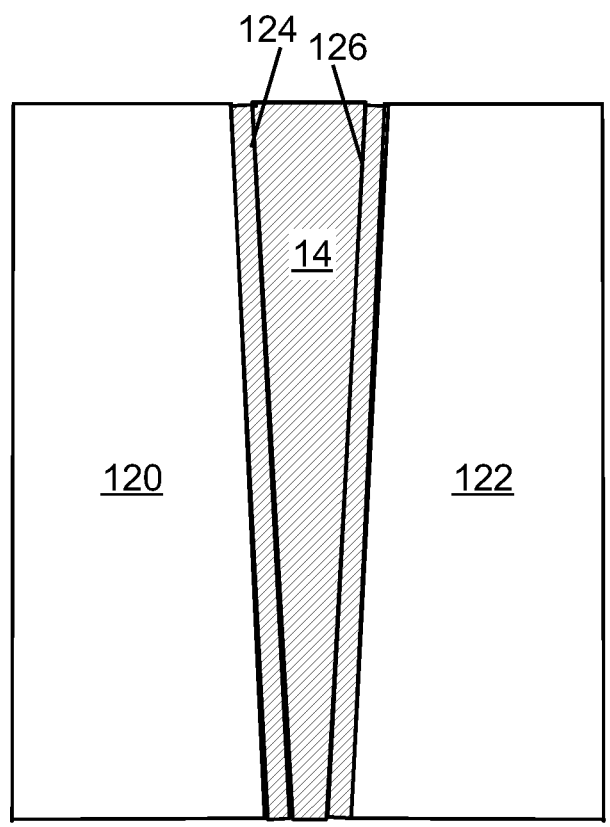

With reference to FIGS. 4 and 5, a variant embodiment is shown by way of an exploded sectional view along Section S-S (FIG. 4) and the assembled section sectional view along Section S-S (FIG. 5). In this embodiment, the two rectangular spacer plates 20, 22 are replaced by wedge-shaped spacer plates 120, 122, so that the two flat spacer plates 120, 122 are arranged in the single plane (e.g. of Section S-S) with facing reflective sidewalls 124, 126 arranged at an angle to each other. (Alternatively, the rectangular plates 24, 26 could be used with the plates tilted relative to one another to define the angle, variant not shown). In this way, as best seen in FIG. 5, a tapered light tunnel passage is defined between the facing first and second reflective flat surfaces (identical with the embodiment of FIGS. 1 and 2). The facing reflective sidewalls 124, 126 are arranged at an angle to each other. The tapered light tunnel passage has the constant dimension H in the direction transverse to the single plane, which is defined by the thickness of the flat spacer plates 120, 122 identically to the embodiment of FIGS. 1 and 2. However, in the embodiment of FIGS. 4 and 5 the constant dimension W of the embodiment of FIGS. 1 and 2 (resulting from the facing sidewalls 24, 26 being parallel to each other) is replaced by a non-constant dimension that varies linearly along the length of the light tunnel passage due to the angle of the facing reflective sidewalls 124, 126. Even more generally, a non-linear tapering could be achieved by having facing reflective sidewalls of parabolic or other curvature, e.g. cut using a diamond saw or other precision glass-cutting machine.

While in the illustrative embodiments the plates 10, 12, 20, 22 are glass plates, plates of any other material can be used, e.g. metal plates. In the case of metal plates made of metal with sufficiently high reflectivity (e.g. aluminum) it may be possible to omit a separate reflective coating.

It will be appreciated that various of the above-disclosed and other features and functions, or alternatives thereof, may be desirably combined into many other different systems or applications. It will be further appreciated that various presently unforeseen or unanticipated alternatives, modifications, variations or improvements therein may be subsequently made by those skilled in the art which are also intended to be encompassed by the following claims.

The invention claimed is:

1. An optical device comprising:
a first element having a first reflective flat surface;
a second element having a second reflective flat surface; and
two flat spacer plates each having a reflective sidewall;
the two flat spacer plates being arranged in a single plane with the reflective sidewalls of the two flat spacer plates facing each other with a gap between the two facing reflective sidewalls;
the first reflective flat surface being arranged parallel with the single plane containing the two flat spacer plates and in contact with the two flat spacer plates;
the second reflective flat surface being arranged parallel with the single plane containing the two flat spacer plates and in contact with the two flat spacer plates; and
the first reflective flat surface and the second reflective flat surface being arranged facing each other on opposite sides of the single plane;
whereby a light tunnel passage with rectangular cross-section is defined between the facing first and second reflective flat surfaces and the facing reflective sidewalls.

2. The optical device of claim 1, wherein the first element comprises a first flat plate arranged parallel with the single plane and the second element comprises a second flat plate arranged parallel with the single plane.

3. The optical device of claim 2, wherein the first flat plate, the second flat plate, and the two flat spacer plates are each a glass plate.

4. The optical device of claim 1, wherein:
the two flat spacer plates have thickness H; and
the two flat spacer plates are arranged in the single plane with the facing reflective sidewalls parallel with each other with a constant gap W between the two facing reflective sidewalls.

5. The optical device of claim 1, wherein:
the two flat spacer plates have thickness H; and
the two flat spacer plates are arranged in the single plane with the facing reflective sidewalls arranged at an angle to each other;
whereby the light tunnel passage is tapered, wherein the tapered light tunnel passage is defined between the facing first and second reflective flat surfaces and the facing reflective sidewalls, the tapered light tunnel passage having a constant dimension H in the direction transverse to the single plane.

6. The optical device of claim 5, wherein H is four millimeters or smaller.

7. The optical device of claim 1, wherein the first and second reflective flat surfaces and the facing reflective sidewalls of the two flat spacer plates are each coated with a reflective coating having reflectivity of at least 0.9 over the wavelength range 400-700 nanometers inclusive.

8. The optical device of claim 1, wherein the first and second reflective flat surfaces and the facing reflective sidewalls of the two flat spacer plates are each coated with a reflective coating having reflectivity of at least 0.95 over the wavelength range 400-700 nanometers inclusive.

9. An optical device comprising:
a first element having a first reflective flat surface;
a second element having a second reflective flat surface facing the first reflective flat surface; and
two flat spacer plates each of thickness H, the two flat spacer plates each having a reflective sidewall;
the two flat spacer plates arranged in a single plane with the reflective sidewalls facing each other, the two flat spacer plates being disposed between the facing first and second reflective flat surfaces and spacing apart the facing first and second reflective flat surfaces by the thickness H of the two flat spacer plates;
wherein the thickness H is constant in a direction transverse to the single plane;
whereby a light tunnel passage having a rectangular cross-section is defined between the facing first and second reflective flat surfaces and the facing reflective sidewalls, the rectangular cross-section having a height equal to the thickness H of the two flat spacer plates.

10. The optical device of claim 9, wherein the first element comprises a first flat plate arranged parallel with the single plane and the second element comprises a second flat plate arranged parallel with the single plane.

11. The optical device of claim 10, wherein the first flat plate, the second flat plate, and the two flat spacer plates are each a glass plate.

12. The optical device of claim 9, wherein the two flat spacer plates are arranged in the single plane with the two facing reflective sidewalls mutually parallel with a constant gap W between the two facing reflective sidewalls.

13. The optical device of claim 9, wherein the two flat spacer plates are arranged in the single plane with the facing reflective sidewalls arranged at an angle to each other.

14. The optical device of claim 9, wherein H is four millimeters or smaller.

15. The optical device of claim 9, wherein the first and second reflective flat surfaces and the facing reflective sidewalls of the two flat spacer plates are each coated with a reflective coating having reflectivity of at least 0.95 over the wavelength range 400-700 nanometers inclusive.

16. An optical device comprising:
two flat plates each having a reflective flat surface; and
two flat spacer plates each of thickness H and each having a reflective sidewall;
wherein the two flat plates and the two flat spacer plates are arranged as a stack of plates with the reflective flat surfaces of the two flat plates facing each other and mutually parallel and the two flat spacer plates arranged in a single plane and disposed between the two flat plates with the reflective sidewalls facing each other and with a gap W between the two reflective sidewalls of the two flat spacer plates, the facing reflective flat surfaces arranged parallel with the single plane containing the two flat spacer plates, the facing reflective flat surfaces of the two flat plates and the facing reflective sidewalls of the two flat spacer plates defining a light tunnel passage having a rectangular cross-section with constant dimension H in the direction transverse to the single plane.

17. The optical device of claim 16, wherein:
the two flat plates and the two flat spacer plates are each a glass plate;
the reflective flat surfaces comprise reflective coatings disposed on the flat surfaces of the two flat glass plates; and
the reflective sidewalls comprise reflective coatings disposed on sidewalls of the flat glass spacer plates.

18. The optical device of claim 16, wherein the two flat spacer plates are arranged in the single plane with the facing reflective sidewalls parallel with each other with a constant gap W between the two facing reflective sidewalls, whereby the light tunnel passage has a constant rectangular cross-section of dimensions H×W.

19. The optical device of claim 16, wherein the two flat spacer plates are arranged in the single plane with the facing reflective sidewalls arranged at an angle to each other, whereby the light tunnel passage has a constant dimension H in the direction transverse to the single plane and is tapered along the length of the light tunnel passage.

20. The optical device of claim 16, further comprising:
the dimension H is four millimeters or smaller; and
all surfaces of the light tunnel passage have reflectivity of 0.9 or higher for a design wavelength or wavelength band.

* * * * *